March 9, 1965   R. W. HITCHCOCK   3,172,324
TWIN BEAM DIE CUTTING PRESSES
Filed May 15, 1963   4 Sheets-Sheet 1

Inventor
Richard W. Hitchcock
By his Attorney
George C. Fuller

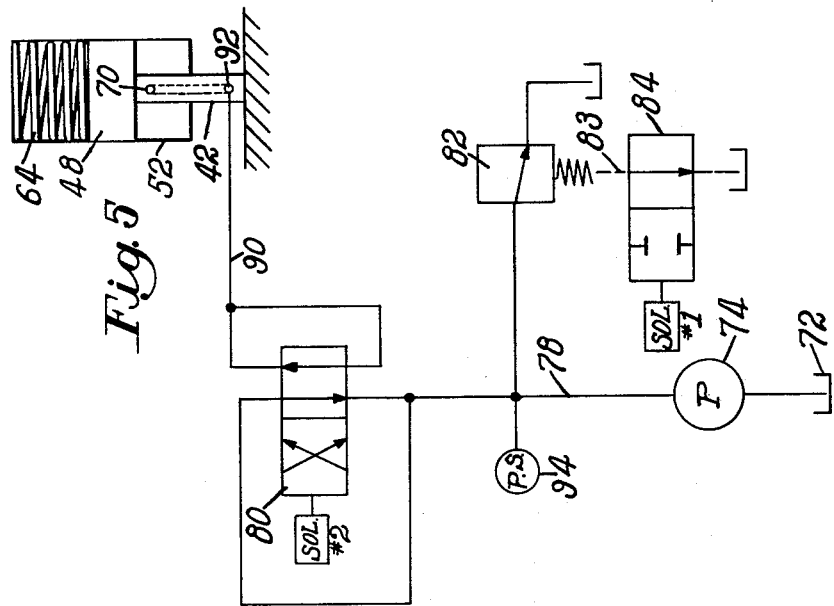
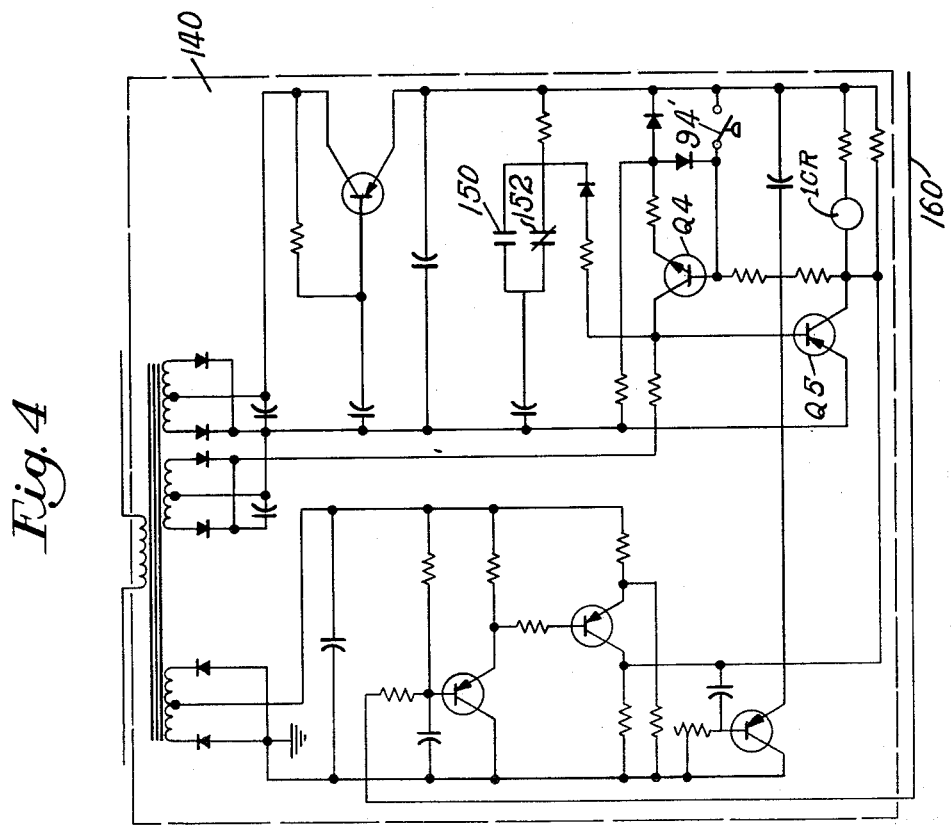

United States Patent Office 3,172,324
Patented Mar. 9, 1965

3,172,324
TWIN BEAM DIE CUTTING PRESSES
Richard W. Hitchcock, Jamaica Plain, Mass., assignor to United Shoe Machinery Corporation, Boston, Mass., a corporation of New Jersey
Filed May 15, 1963, Ser. No. 280,641
3 Claims. (Cl. 83—538)

This invention relates to improvements in die cutting presses and more particularly to improvements in such presses having two pressure applying beams and commonly referred to as twin clickers.

Present twin beam machines having vertical posts mounted at opposite sides of a relatively wide cutting bed are well adapted to the through feed and cutting of wide material. For this purpose the machines have been provided either with overlapping beams or with butting beams, depending on which arrangement best suited the work conditions. In the overlapping beam arrangement the beams extend beyond the center of the cutting bed and are advantageously employed to insure coverage of the work area when using small dies.

For cutting heavy work or in using large dies, the butting beam arrangement is often advantageous in that it permits both beams to press simultaneously on a die. In this arrangement, the two beams are somewhat shorter, extending substantially to the middle of the cutting bed. To permit the beams to be swung in and out of butting disposition, their end surfaces, particularly at the corners, are rounded off to a greater or less degree as it will be seen that two butting square ended beams of substantial width would tend to jam when it is attempted to swing them open. In their butting disposition, the beams may be used simultaneously on a centrally located die. Thus, by sharing the load of a die spanning the beam ends, the beams may operate more effectively at the center so that heavier work or larger dies may be accommodated. However, the rounding of the beam ends necessary to permit the beams to swing past each other produces uncovered cusp shaped areas of the cutting bed on each side of a center line passing between the posts where a die spanning the butting beam ends will be unsupported. Thus, dies which are to be used in these areas must have relatively large strength requirements, preventing the free use of dies having punch attachments or of inexpensive dies such as the so-called steel rule dies.

Accordingly, it is an object of the present invention to provide, in a twin beam die cutting press having means for causing the two beams simultaneously to be moved toward a cutting bed in a cutting stroke, beams of substantial width which may be swung into and out of butting disposition while leaving a minimum of uncovered area of the cutting bed between the beam ends where a die will not be supported and where the danger of die breakage exists.

To this end and in accordance with a feature of the present invention, there is provided a die cutting press having two beams of substantial width supported on vertical columns on opposite sides of a cutting bed, the end edges of the beams being separated by a substantially uniform amount from one side to the other when the beams are in butting disposition. To permit the beams to be swung out of butting disposition, all end edge portions of at least one of the two beams have an arc of swing which is, in a given direction, clear of all portions of the other beam. The spacing of the end edges of the beams in butting disposition is only enough to avoid beam end cramp which might occur if the beams were released from load while in engagement.

In one arrangement of beams providing for opening and closing of the beams while minimizing the unsupported area between the beam ends, the side edges of each beam may be of equal length. In this arrangement, the end edge of one beam is formed convex so that all portions have a common arc of swing while the end of the other beam is conformed concavely thereto. However this arrangement has the disadvantage that in opening the beams from their butting disposition the convex ended beam must be swung completely out of the way of the other beam before the latter can be moved.

Accordingly, I prefer beam arrangements in which the sides of the beams are of unequal length and particularly arrangements wherein the two beams are similarly shaped as this simplifies manufacturing. In the simplest and preferred embodiment illustrated, the end edge of each beam is substantially straight between corners at the long side edge and the short side edge of the beam, the end edge forming an angle of at least approximately 90° with a line between the pivot axis and the intersection of the end edge and the short side edge of the beam whereby the trailing corner, the most critical portion of the end edge so far as clearance is concerned, may be swung past the other beam without interference therewith. When the beams are similar and each is provided with such an end edge, either beam may be swung out in one direction from this disposition immediately separating the end edges so that the end of the other beam may be moved in the same direction to some extent at least before the first end has been swung completely beyond the second. Further, since the long side corner of each beam extends beyond the center of the cutting bed, the advantage of beam reach for certain small dies provided by overlapping beams is retained.

Other features and advantages of the invention will best be understood from the following description taken together with the accompanying drawings in which:

FIG. 4 is a schematic of a component shown in the diagram of FIG. 3; and

FIG. 5 is a diagram of the hydraulic circuit employed in the apparatus shown in FIG. 1.

Figure 1:
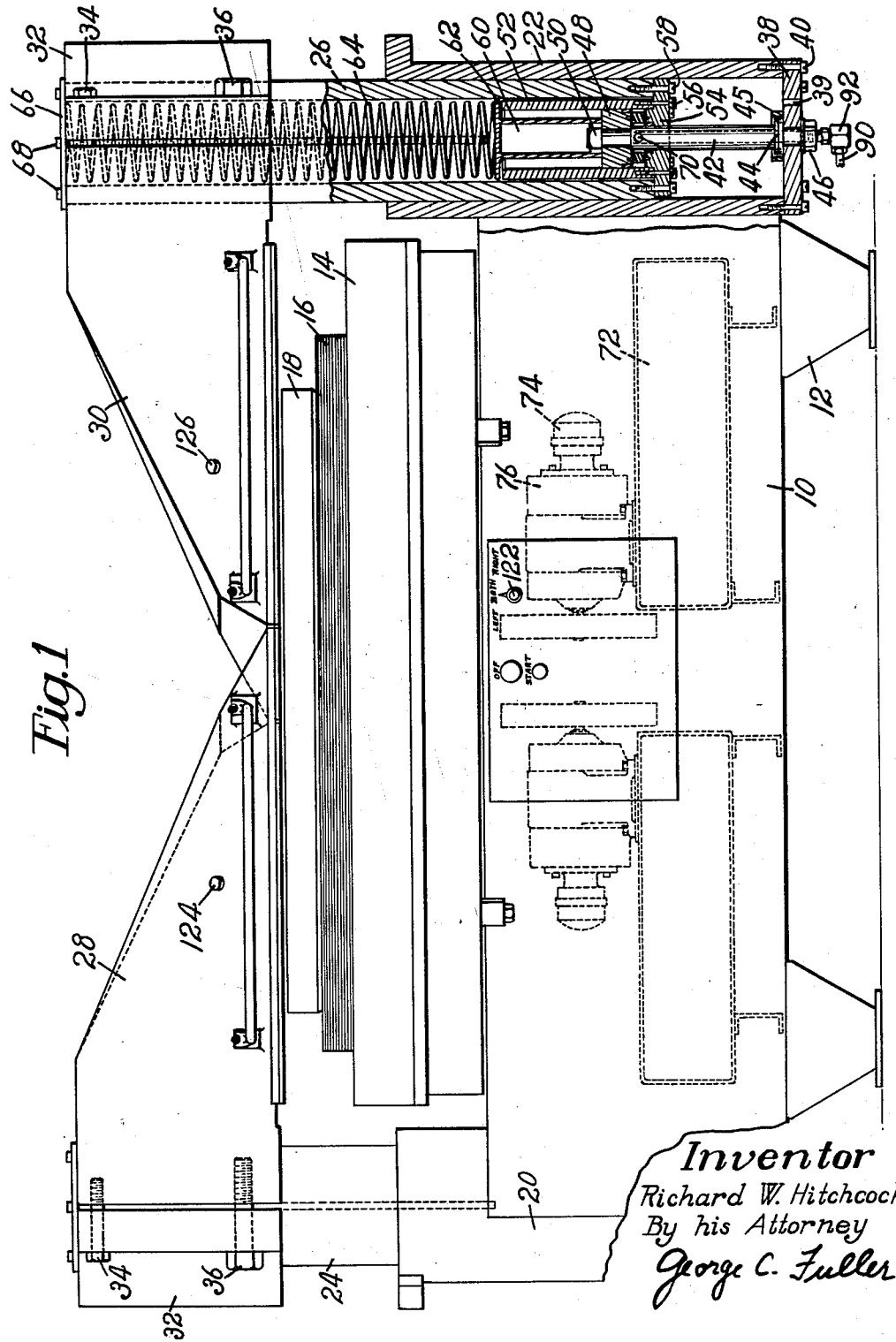
FIG. 1 is a front elevation of apparatus embodying the present invention.
Figure 2:
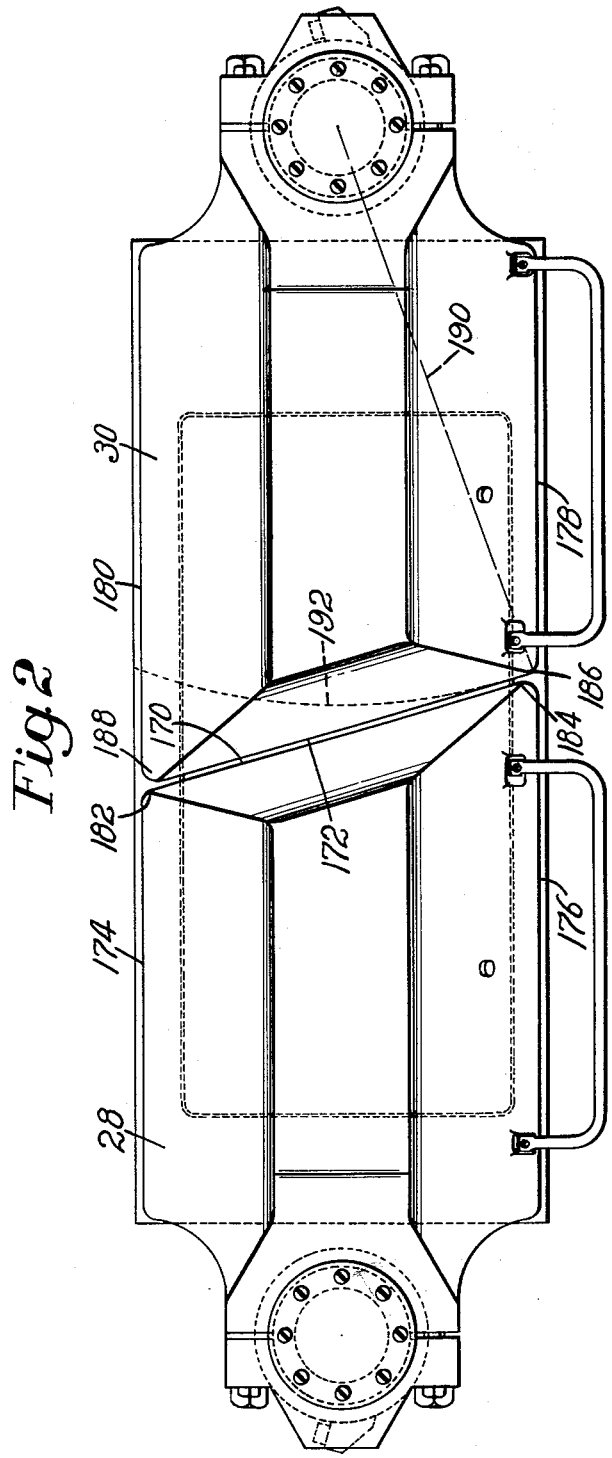
FIG. 2 is a plan view of apparatus shown in FIG. 1.

Referring to FIGS. 1 and 2, the illustrative die cutting press comprises a frame 10 of sheet steel carried on legs 12 and supporting a cutting bed 14 at least the upper surface of which comprises electrically conductive material. The cutting bed 14 supports plies 16 of cloth or other materials to be cut by means of a die 18. Welded to the frame 10 at opposite sides of the cutting bed are a left bearing 20 and a right bearing 22 in which are journaled a left vertical post 24 and a right vertical post 26. A left beam 28 and a right beam 30 comprising the upper presser members of left and right stations of the press, are carried respectively by the posts 24 and 26, being fastened thereto by clamps 32, 32 secured to the beams by small bolts 34 and also bolts 36. The stations are symmetrical and only one station will now be described in detail.

To the bottom of the bearing 22 a bottom cover 38 having a vent 39 is fastened by screws 40. A piston rod 42 extends through the cover 38 on which it is rotatably supported by a thrust bearing 44 inside a stop collar 45 and a nut 46 threaded on the piston rod outside the cover. At the upper end of the piston rod 42, a piston 48 is carried on a portion of reduced diameter the upper end of which threadedly receives a retaining nut 50. A cylinder 52 slidably disposed over the piston 48 is connected to the vertical post 26 by means of a cylinder cover 54 which is bolted to the cylinder and to the post by screws 56 and 58 respectively. A spring support 60 is carried by the piston rod 42, a circular plate portion 62 of the support engaging one end of a beam return spring 64 the other end of which bears against a beam plate 66 secured to the beam 30 and its clamp 32 by the screws 68.

Referring now also to FIG. 5, the piston rod 42 has a central passage through which an orifice at the outer end of the rod communicates with a cylinder port 70 and thus with the interior of the cylinder. Pressure fluid from a sump 72 is supplied by a pump 74 driven by a motor 76 to a conduit 78 leading to a two position four way solenoid valve 80 and a two way relief valve 82 piloted through a pilot line 83 by a two position two way solenoid valve 84. When the solenoid of the valve 84 is energized stopping the pilot line, the valve 82 is closed allowing pressure to be built up in the conduit 78. When the solenoid of the valve 80 is energized pressure fluid may pass through the valve between the conduit 78 and the cylinder 52 through a cylinder supply line 90 connected by a swivel fitting 92 to the piston rod 42. The direction of flow is determined by the pressure in the conduit 78; if the valve 82 is closed fluid enters the cylinder to move it downward; if the valve 82 is open fluid exhausts from the cylinder to the sump permitting the spring 64 to raise the cylinder. When the solenoid of the valve 80 is deenergized pressure fluid is prevented from entering or leaving the cylinder and the cylinder is thereby hydraulically "locked up."

Figure 3:
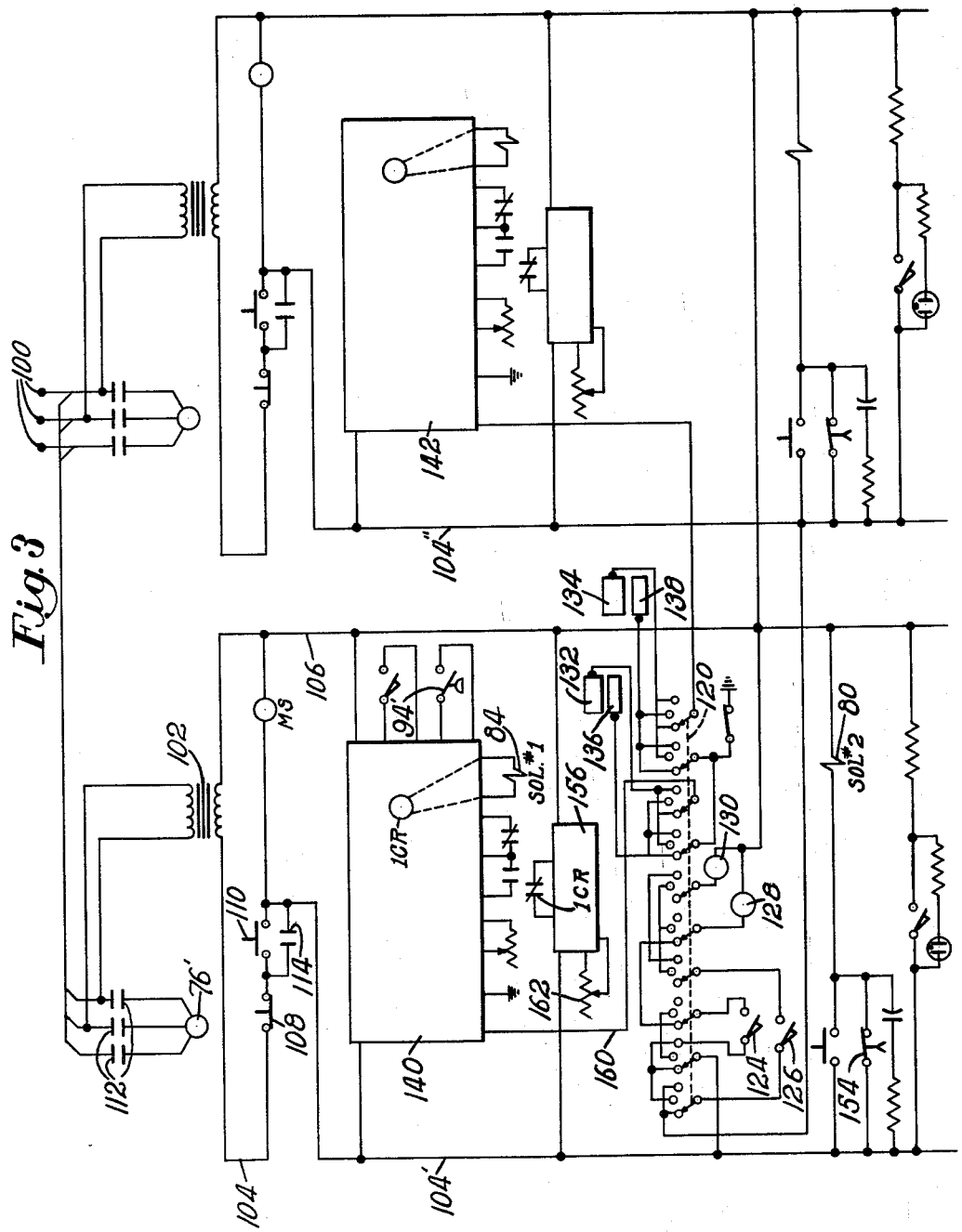
FIG. 3 is a diagram of the electric control circuits employed in the apparatus shown in FIG. 1.

The schematic shown in FIG. 3 represents the electric circuits for the left and right presser stations which are similar except for the inclusion in the left station panel of a selector switch means for establishing the mode of operation, that is whether the left or the right beam is to be used individually or whether the two beams are to be employed simultaneously. Accordingly the schematic will be described in detail as it applies to the left station panel and it will be understood that the operation of the right station panel is similar as to its duplicate parts. The control circuits are supplied at terminals 100 with three phase power from branch circuit overcurrent and disconnect means not shown. A transformer 102 has its primary connected across one phase while its secondary supplies control feeders 104, 106. A start circuit for the left pump motor 76' comprises a normally closed stop button 108, a start button 110 and a motor contactor solenoid MS connected in series across the feeders 104 and 106. When the button 110 is depressed, the solenoid MS closes motor contactors 112 and also closes contacts 114 shunting the stop button 110 to supply current to the feeder 104' from the feeder 104. A selector switch 120 controlled by knob 122 (FIG. 1) and having ten poles with three positions is arranged selectively to connect the control circuits for using either or both beams. The switch operates to connect a left beam trip switch 124 and a right beam trip switch 126 to the feeders 104' and 104'' of the left and right station for selective energization of a left control solenoid 128 and a right control solenoid 130 so that in the left position of the selector switch the solenoid 128 will be energized by closure of the switch 124 while the solenoid 130 cannot be energized. In the right position of the selector switch the solenoid 130 can be energized by closure of the switch 126 and in the center position both solenoids are energized only when both the switches 124 and 126 are closed. Other portions of the selector switch are simultaneously effective operatively connecting right and left striking plates 132, 134 and left and right conductive pads 136 and 138 to the left and right transistor stroke controls 140, 142. Suitably and as shown the selector switch operates so that when the beams are employed individually the pads which provide the cutting surface of the cutting bed are grounded while when the two beams are employed simultaneously the striking plates are grounded.

The control circuits 140 and 142 are shown in greater detail in FIG. 4 and comprise transistor circuits of the type disclosed in United States application Serial No. 231,240, filed October 17, 1962 in the name of Robert W. Bradley. This application may be referred to for a detailed description of the operation of the control. Briefly, with the selector switch set for individual use of the left beam, actuation of the trip switch 124 is effective to energize the solenoid 128 which transfers contacts 150 and 152 of the left control 140 causing transistors Q4 and Q5 to conduct. The collector current of the transistor Q5 energizes the solenoid of the valve 84 causing the valve to close permitting pressure to build up in the conduit 78. In the meantime the solenoid of the valve 80 has been energized from the feeders 104', 106 through the contacts 154 of a time delay timer 156 so that the beam is caused to be brought down under pressure. The stroke continues until the cutting die has cut through the work forming a conductive bridge between the striking plate and the conductive pad forming a grounding signal which is transmitted to the control 140 through a line 160. The signal is operative to cause the transistors Q4 and Q5 to cut off deenergizing control relay 1–CR. When 1–CR is deenergized, the valve 84 opens permitting the valve 82 to bleed pressure from the line 78 at the same time the normally closed contacts 1–CR of the timer 156 close initiating a timing cycle of a duration dependent upon the setting of a variable resistor 162. The stroke may also be terminated by action of a pressure switch 94 having contacts 94' operable to cut off the transistors Q4 and Q5. At the end of the timing cycle the timer opens the contacts 154 deenergizing the valve 80 to "lock up" the cylinder. During the timing cycle pressure fluid has exhausted from the cylinder through the valve 80 and the conduit 78 while the beam has been raised by the spring 64. Accordingly, the upper or rest position of the beam is determined by the setting of the timer. It is believed from the foregoing description that the operation of the controls when employing the right beam and when employing the two beams simultaneously will be obvious. Accordingly the foregoing provides a description of a cutting press comprising a cutting bed and two beams of substantial width mounted on vertical posts at opposite sides of the cutting bed together with means for effecting movement of either or both of said beams toward and away from the cutting bed in a cutting stroke.

Referring now to FIG. 2 showing in plan a preferred embodiment of the invention, the two beams 28 and 30 have end edges 170 and 172 respectively. The beam 28 has side edges 174 and 176 while the beam 30 has side edges 178 and 180. The end edges 170 and 172 are separated by a substantially uniform amount from one side to the other side when the beams are in their illustrated butting position, for example, from a side edge 174 to the other 176 of the beam 28. Because the beams shown in FIG. 2 have the same width, their end edges are coextensive, but if one beam were narrower than the other, the closely spaced relation would extend only between the sides of the narrower beam. It will be understood that in the butting disposition of the beams, the end edges will be spaced as closely as feasible while leaving sufficient spacing, suitably, for example, 3/8", to render it improbable that relative rotational movement of the beams during a stroke could bring their end edges together while under load, which event might result in beam cramp upon release of the beam pressure because of post deflections. The end edge of the beam 28 meets the side edges 174 and 176 at corners 182 and 184. Corresponding corners 186 and 188 are defined for the beam 30. To permit either beam to be swung out of butting disposition, each end edge portion of either beam has an arc of swing clear of the other beam in a given direction, clockwise as shown. In a mechanically simple and effective arrangement for this purpose the side edges of each beam are of unequal length and are joined at short side corners 182, 186 and long side corners 184, 188 by the end edges 170, 172 which preferably are straight.

In order that a beam having a straight end edge may be swung out, it will be seen that the edge must be formed at an angle of at least about 90° to a line between the pivot axis and the intersection of the end edge and the short side edge to permit the trailing corner to clear the other beam. Thus the edge 172 forms an angle of about 90° with the radius of swing 190 of the corner 186 so that the arc of swing 192 of the corner 186 clears the beam 28.

It will be appreciated that a number of end edge contours other than straight could be provided which would permit one beam to be swung from butting disposition clear of the other beam. With the exception of the case wherein one beam has its end edge rounded in conformity to the arc of swing while the other end edge is concave, the clearance of one beam requires that the beams have sides of unequal length. For example, the end edge contours can be stepped, provided the steps are small enough to clear the other beam. Where only one beam need be clear to swing out of butting disposition, its end edge, from the centerline of the beam to the leading side edge, may be straight and normal to the leading edge at the long corner of the beam. The end edges can also take several different arcuate shapes such as one in which the trailing half of the end edge follows the contour of the arc of swing of the short corner while the leading half of the end edge is straight across. Also the edge may be in the form of an ogee or reverse curve following the arc of swing of the short corners of first one and then the other beam.

Having thus described my invention what I claim as new and desire to secure by Letters Patent is:

1. A twin beam die cutting press comprising, in combination, a cutting bed, a pair of presser beams of substantial width mounted on vertical posts at opposite sides of the cutting bed for swinging thereover and for movement toward and away from the cutting bed, means operable to effect movement of said beams toward and away from the cutting bed for pressing dies through work pieces thereon, said beams being provided with end edges separated by a substantially uniform amount from one side to the other when the beams are in butting position, the end edge portion of at least one of the beams having, when the beams are in butting position, an arc of swing clear of the other beam in a given direction.

2. Apparatus as in claim 1 wherein each beam has sides of unequal length.

3. Apparatus as in claim 2 wherein the end edge of each beam is straight and the angle, formed by the end edge and a line between the swing pivot and the intersection of the end edge and the side edge on the short side of the beam, is equal to or greater than approximately 90°.

References Cited in the file of this patent
UNITED STATES PATENTS

| | | |
|---|---|---|
| 1,185,625 | Brothers | June 6, 1916 |
| 1,389,654 | Hadaway | Sept. 6, 1921 |
| 1,431,920 | Ballard | Oct. 17, 1922 |